United States Patent
Steinel et al.

(10) Patent No.: US 7,725,539 B2
(45) Date of Patent: May 25, 2010

(54) METHOD, COMPUTER PROGRAM, AND SYSTEM FOR CARRYING OUT A PROJECT

(75) Inventors: Hermann Steinel, Hankensbuettel (DE); Bjoern Kothe, Wolfsburg (DE); Michael Salewski, Bad Salzdetfurth (DE); Bernd Poettner, Wolfsburg (DE); Olaf Baumert, Oebisfelde (DE)

(73) Assignee: Volkswagen AG, Wolfsburg (DE)

( * ) Notice: Subject to any disclaimer, the term of this patent is extended or adjusted under 35 U.S.C. 154(b) by 2008 days.

(21) Appl. No.: 10/343,266

(22) PCT Filed: Jul. 25, 2001

(86) PCT No.: PCT/EP01/08659

§ 371 (c)(1),
(2), (4) Date: Jul. 24, 2003

(87) PCT Pub. No.: WO02/08924

PCT Pub. Date: Jan. 31, 2002

(65) Prior Publication Data

US 2004/0039771 A1     Feb. 26, 2004

(30) Foreign Application Priority Data

Jul. 26, 2000   (DE)   ................................. 100 36 395
Oct. 5, 2000    (DE)   ................................. 100 49 624

(51) Int. Cl.
*G06F 15/16*     (2006.01)
(52) U.S. Cl. ................... 709/205; 709/204; 709/218
(58) Field of Classification Search ............... 709/204, 709/205, 218

See application file for complete search history.

(56) References Cited

U.S. PATENT DOCUMENTS

| | | | | |
|---|---|---|---|---|
| 5,530,892 | A * | 6/1996 | Hwang | 710/2 |
| 5,767,848 | A * | 6/1998 | Matsuzaki et al. | 715/751 |
| 5,800,181 | A | 9/1998 | Heinlein et al. | |
| 6,181,689 | B1 * | 1/2001 | Choung et al. | 370/352 |
| 6,487,195 | B1 * | 11/2002 | Choung et al. | 370/352 |
| 7,072,940 | B1 * | 7/2006 | Day et al. | 709/204 |
| 7,127,501 | B1 * | 10/2006 | Beir et al. | 709/219 |
| 2002/0129106 | A1 * | 9/2002 | Gutfreund | 709/205 |

OTHER PUBLICATIONS

Anumba C.J. et al., "Internet and intranet usage in a communications infrastructure for virtual construction project teams," Enabling Technologies: Infrastructure for Collaborative Enterprises, 1997, Proceedings, Sixth IEEE Workshops on Cambridge, MA, USA Jun. 18-20, 1997, Los Alamitos, CA, USA, IEEE Comput. Soc., US, Jun. 18, 1997, pp. 56-61.

* cited by examiner

*Primary Examiner*—Liangche A Wang
(74) *Attorney, Agent, or Firm*—Kenyon & Kenyon LLP

(57) ABSTRACT

In a method, a computer program and a system for carrying out a project from a plurality of differently located electronic data processing (EDP) devices, which are connected via a data network with a main server serving the central data loading for the purpose of data exchange and whereby, during individual working time intervals, respectively one other from the plurality of EDP devices for carrying out the project is at least partially activated. A method, computer program and system provide that employees at other sites, located at a distance from the main server, are permitted full cooperation in a project. The data network is configured in a cross-locational manner, and that the individual EDP devices are located distributed at least partially in a cross-locational manner.

105 Claims, 5 Drawing Sheets

METHOD, COMPUTER PROGRAM, AND SYSTEM FOR CARRYING OUT A PROJECT

FIELD OF THE INVENTION

The present invention relates to a method for carrying out a project from a plurality of differently located electronic data processing (EDP) devices, which are connected via a data network with a main server serving the central data loading for the purpose of data exchange and whereby, during individual working time intervals, respectively one other from the plurality of EDP devices for carrying out the project is at least partially activated.

The present invention further relates to a computer program and a system for the implementation of at least individual steps of this method.

BACKGROUND INFORMATION

In many larger companies, EDP devices at differently located workplaces are networked with one another, for example by a Local Area Network LAN. Employees then have the opportunity to store their respective work results for a project, which they have acquired during a working time interval, e.g. during an 8-hour working day, on a main server via the EDP device at their workplace and the LAN. These work results can then also be retrieved again at any time, in particular at the start of a subsequent working time interval, from other EDP devices connected to the LAN in order to continue the project work from there.

Hitherto, however, such methods for carrying out projects have been provided solely for spatially limited applications, in particular solely related to a company site. This has the drawback that employees at other sites cannot readily be involved in the project work.

It is therefore an object of the present invention to provide a method, computer program and system in which employees at other sites, located at a distance from the main server, are permitted full cooperation in a project.

SUMMARY

The foregoing object may be achieved by providing a method as described herein. More precisely, the foregoing object may be achieved by the fact that the data network is designed supra-regionally, in particular internationally, and that the individual EDP devices are located distributed at least partially supra-regionally.

The term supra-regional (trans-regional) should be understood in the present invention in the broadest sense as extending beyond the site of a company. In particular, supra-regional means located beyond a region of a country of the world or international, i.e., in different countries of the world. The method according to the present invention may enable the implementation of a project relay, in which different operators of EDP devices may work on the same project temporally and spatially independently of one another, in particular temporally one after the other. The operators do not need to leave their site. In particular, they do not need to travel to the site of the main server. This may save traveling expenses and working time.

The project work may be organized in a more variable manner by the method according to the present invention. For example, better use may be made of free capacities at individual sites of a company. If need be, external partners of a company may also be involved without loss of information.

Non-line-linked parts of the data network are, for example, a satellite transmission link or a mobile radio network.

With a supra-regional or even international location of at least some EDP devices, an employer may profit from a lower wage level that may exist in other regions or countries. Supra-regional, particularly worldwide, development capacities may be used in this manner. A know-how transfer between sites may take place, so that development standards may be harmonized worldwide if need be.

If the EDP devices are located in different world time zones, the time lag may be used to extend the project working time per day, without the need to work longer than usual at a site, e.g., approximately 6 to 8 hours, depending on the current time lag and local/collectively agreed working time arrangements. At the end of a work shift, i.e., of a working time interval, at a first site, the project work may be continued at a second site which has a time lag compared with the first site. In this manner, greatly reduced times may be achieved for the partial or total project execution without suffering loss of quality, and an earlier market launch of a product resulting from the project work may thus be achieved. A project may be carried out with a time stagger from three different sites, which all have a time lag of 7 hours with respect to one another. Continuous project work without a time overlap may be possible.

For the implementation of such cross-locational project work, it may be provided to take recourse at least partially to existing data networks, such as the Internet, an intranet or a Wide Area Network WAN, and available software program, such as Internet browsers. The networks used may be protected against data misuse.

Depending on the type of project to be carried out, it may be provided that data transmission takes place in real time in the data network, in particular between an EDP device and the main server.

For a smooth transition in the project work between two successive working time intervals, it may be provided that not only specific object data assigned to a current work object, e.g., work results in the form of computer-aided design CAD data, are logged and stored in at least one object file, but also project management data in a separate project management file. The project management data include, in particular, the work steps carried out during a particular working time interval, i.e., a work shift, their sequence and/or the current project status, etc.

Apart from the object data and the project management data, project data in the form of project files, in particular from an EDP device, may be filed on the main server. Project data are general data available for the implementation of the project, such as product information or planning data. After their storage on the main server, project data may also be retrieved by all the participants in the project, in particular also by other EDP devices.

The storage and logging of all data, i.e., object data, project management data or project data, takes place essentially during a particular working time interval. A formal termination of storage or logging may only take place at the end of a shift. The logging may make it easier for an employee, i.e., an operator for an EDP device, to become familiarized at the start of a new or a following working time interval.

The logging of the object data and/or the project management data may take place with the aid of suitable screen pages, in particular in the form of input masks, on a screen of the EDP device currently active. The input masks interrogate the employee regarding the information to be logged.

The time that an employee requires to search for information may be significantly shortened by the loading of knowledge databanks.

Project monitoring accessible via the EDP devices may enable an online overview at any time of the worldwide progress with the project, the employees participating in the project, their tasks within the project and general project information.

A time model overview provides information upon request concerning the present times at the various sites.

The present invention is not limited to the execution of certain kinds of project. Cross-locational project work is possible, therefore, not only for the development of products, but also during their tests. Furthermore, the present invention may be used for the remote control of plants in general. Examples are the remote control of a plant for product development, in particular of an engine test bench, a cash dispenser, a production line, a power station, a rocket silo, etc.

If the present invention is used for the remote control of plants, then the main server is a component of a testing station for controlling the plant and the EDP devices are then each designed as remote-control devices for the remote control of the plant via the data network and the testing station.

The testing station and/or the remote-control device respectively may carry out a data reduction before they transmit the resultant data to the respective other device.

An efficient method for data reduction, which may be carried out both in the testing station as well as in the remote-control device, is the capturing of screen data, which becomes available on the various screens of these devices.

The object of the present invention may be further achieved by providing a computer program for the implementation of at least individual method steps and by providing a system for implementing the method. The features and aspects of this computer program and the system correspond to the features and aspects stated above for the method.

Further features, aspects and developments of the method and the system are described below.

DETAILED DESCRIPTION

Figure 1:
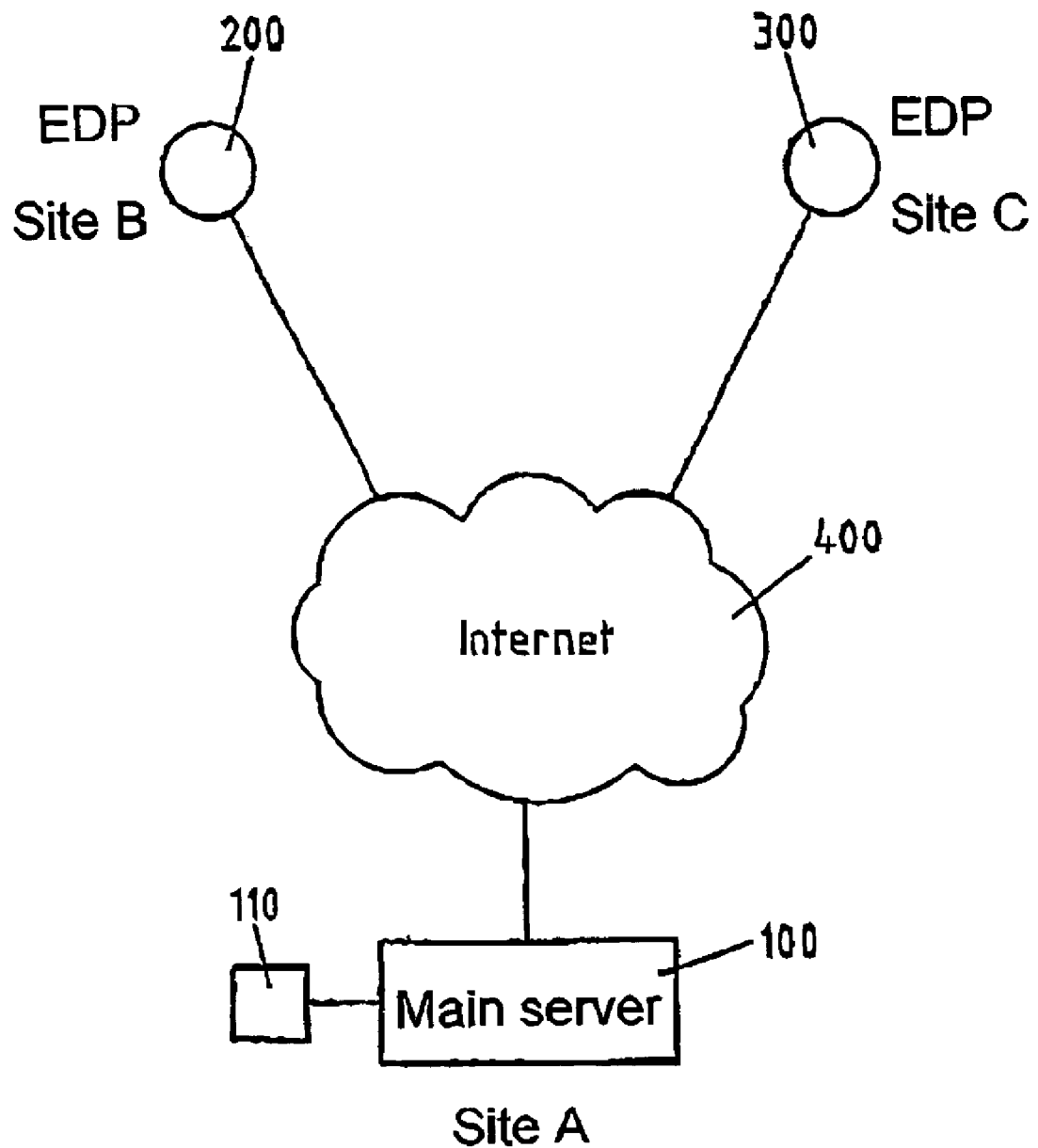
FIG. 1 is a schematic view of a data network, such as forms the basis of the present invention.
Figure 2:
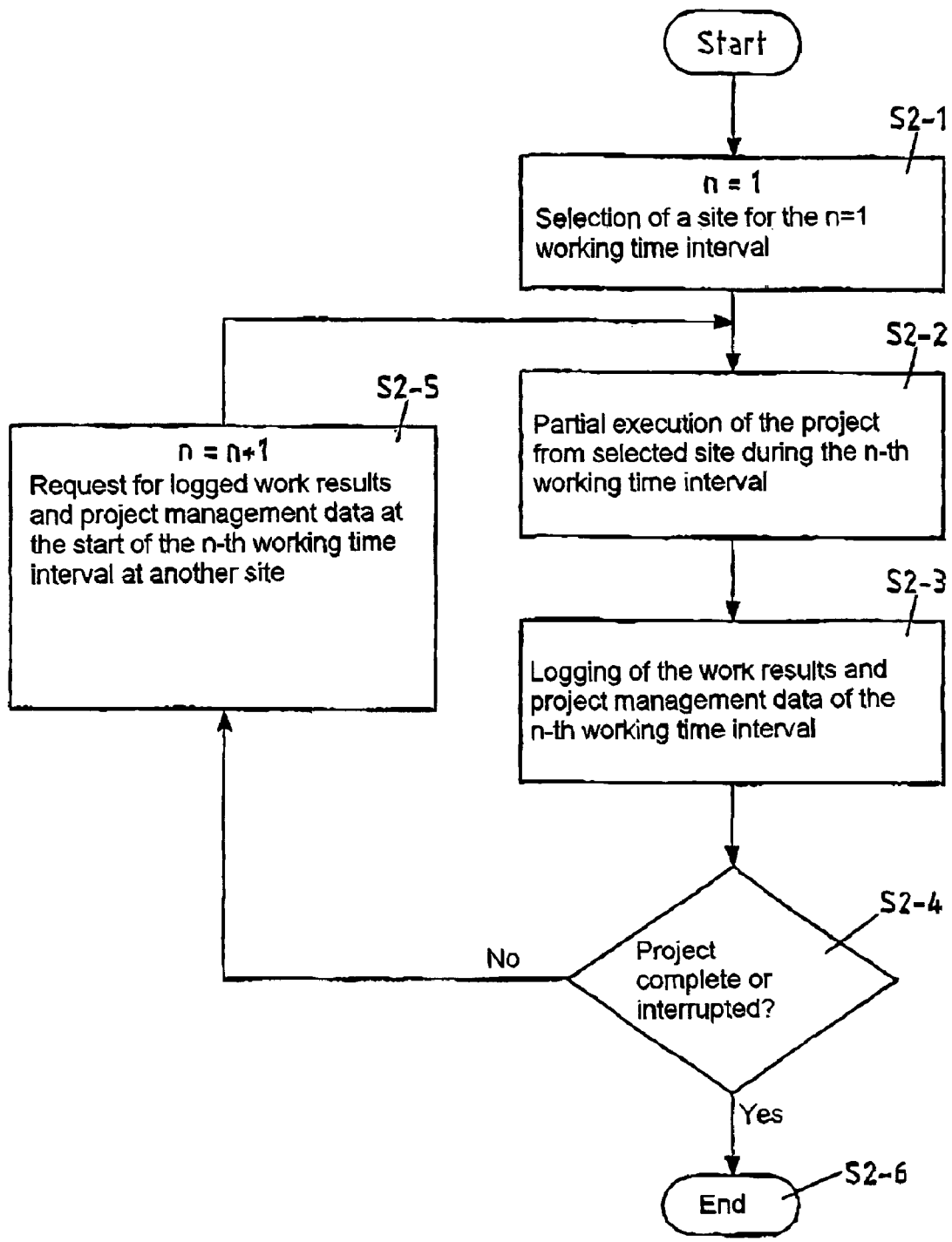
FIG. 2 is a flowchart illustrating a sequence of the method according to the present invention in accordance with a first example embodiment.
Figure 3:
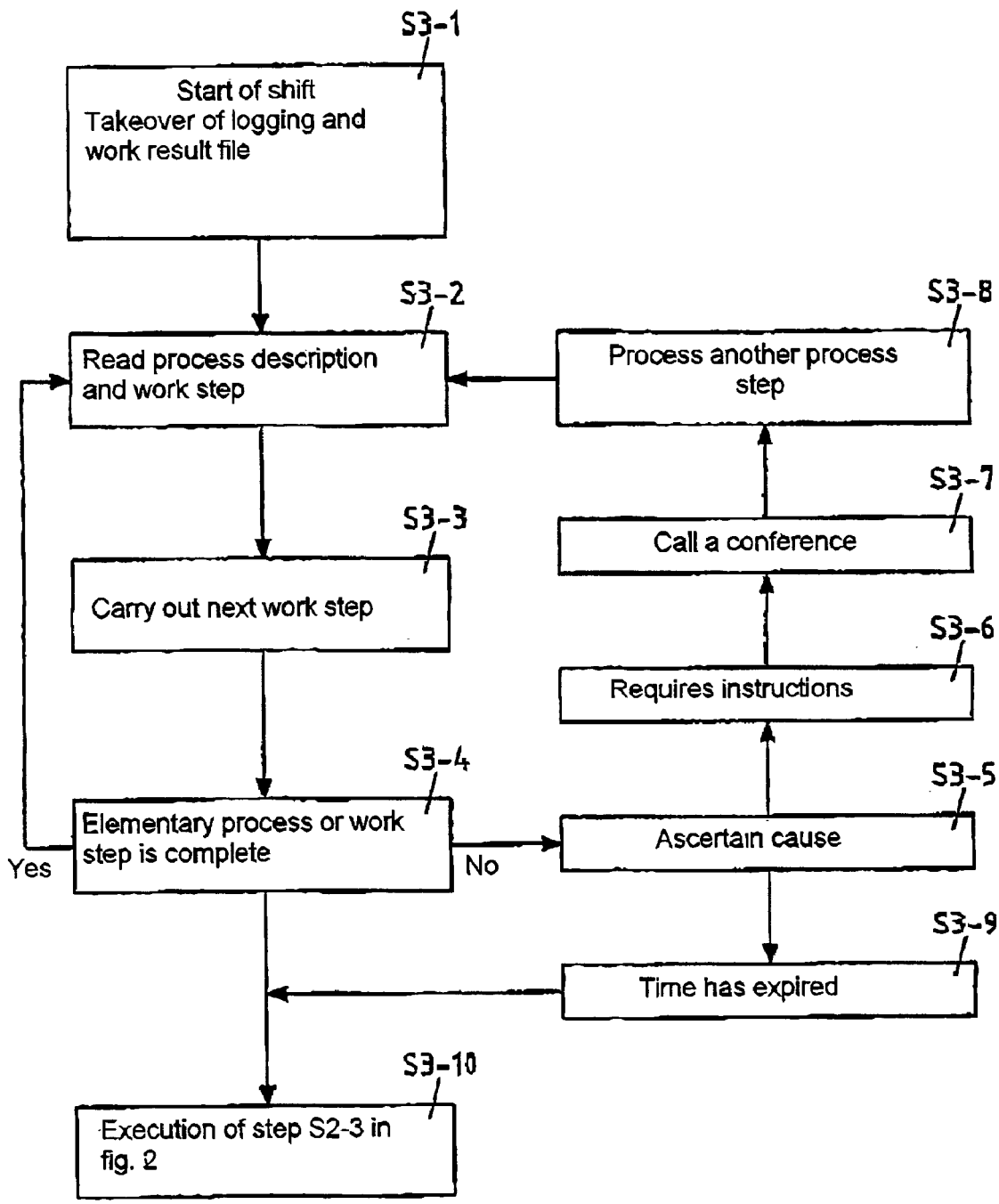
FIG. 3 is a schematic detailed overview concerning the procedure during a working time interval.

FIGS. 1 and 2 relate to the present invention in general. FIG. 3 is also kept general for the most part. It also relates in part, however, to a specific first example embodiment of the present invention, according to which the present invention is used for the supra-regional design of a component.

FIG. 1 illustrates a data network 400 such as generally forms the basis of the present invention. It connects a main server 100 at a first site A with two devices 200, 300 for electronic data processing EDP, which are located respectively at different sites, a second site B and a third site C. Individual sites A, B, C are distributed supra-regionally, e.g., on different continents. Data network 400 may include a network protected against data misuse, i.e., a registered or in-house data network, e.g., an intranet. It is also possible, however, to use the Internet as data network 400. A direct connection between EDP devices 200 and 300 to sites B and C is not necessary.

FIG. 2 illustrates, as a first example embodiment of the present invention, a sequence of the method according to the present invention for the design of a motor vehicle component at various EDP sites. Accordingly, one of the available sites, e.g., site B, is selected in a first method step S2-1, so that an operator begins there with the project work during a first working time interval n=1, as is represented in step S2-2. During or at the end of the n=1-st working time interval, the work results obtained during this working time interval are then logged and stored in an object file and project management data in their own project management file in accordance with step S2-3.

The object file contains, for example, information concerning work actually carried out, i.e., in particular concerning what has been done on the component. Furthermore, it provides information concerning the work step of the project currently being carried out, if the latter has not yet been completed, and concerning the next pending work step. Furthermore, it may provide information concerning as yet unsolved problems that have arisen, concerning references to other components, concerning persons contacted or concerning information required.

The project management data, on the other hand, include in particular the work steps to be carried out according to plan for a particular working time interval, their sequence and/or the current project status.

The object data and the project management data together may contain all the important information that may be required for a subsequent continuation of the project work in a subsequent working time interval. The storage of both the object data and the project management data may take place on a data memory 110 assigned to main server 100.

Before a continuation of the project work in a subsequent working time interval n=n+1, a check is first made according to step S2-4 to establish whether the project is complete or is to be interrupted. If that is the case, the method is then terminated S2-6.

If that is not the case, the subsequent working time interval is started according to step S2-5 by retrieving the stored object data and project management data of the preceding working time interval. On the basis of this information, the project work is then continued with step S2-2. Apart from the retrieved data, the operator may also contact other people via e-mail, telephone or videoconference in order to clarify current problems quickly. The following working time interval may be completed by an operator at site C with the aid of the EDP devices available there.

Reference may be made at this point to the described logging of project management data according to the invention. Compared with a mere retrieval of object data, this not only may enable a more rapid entry into the continuation of the project work, especially if it also contains comments, instructions or guidelines for future design steps. In addition, it also may enable good and straightforward project documentation, e.g., in the form of documents for quality documentation, training papers, etc. The logging may be carried out at least partially automatically, in that the individual work steps are checked for certain patterns filed in a databank.

If the object file and the project management file, as described above, are stored in a data memory 110 assigned to main server 100, this may provide that the data may then be managed completely automatically. The transported volume of data then corresponds to the actually required volume. Each of the EDP devices 200, 300 may then have the currently required data available. Depending on the utilization and capacity of the data network, however, a more or less long response and waiting time for the required data occurs. This drawback may be avoided by a replication of the files on main server 100 to EDP devices 200, 300. As a result of the replication, complete and up-to-date data may always be available to the EDP devices at the individual sites. The data on the central main server serve as a master dataset, which with appropriate routines may be replicated on the other EDP devices 200 and 300. For the replication, only those data need be copied that have actually been changed. Generally, this may only be a small part of the total data stock.

Apart from replication, there are numerous other methods of data transmission, e.g., by a so-called file transfer protocol FTP.

With reference to FIG. 3, the procedure during a working time interval according to step S2-2 illustrated in FIG. 2 will be described in greater detail, on the basis that logged information is available from the preceding working time interval.

After taking over the object data and the project management data from the preceding working time interval for the design of the component from the corresponding files in step S3-1, the operator at a remote EDP device 200, 300 extracts from these data a description of the current process status and the next work step, step S3-2, and carries this out, step S3-3.

If the project management file is not available or only incompletely available, for example in the absence of comments for the subsequent work steps, this may mean a conflict situation in which extraordinary steps have to be taken. In this case, it is recommendable to establish contact with colleagues at the site where the preceding working time interval has taken place in order to complete the data. After clarification of the cause of the incomplete project management file, a replication of the current data, for example, is carried out and a comment concerning the conflict situation is recorded in the project management file.

When this work step has been completed, the project work is continued according to step S3-4 with the next planned work step for the design of the component according to S3-2 and so forth. This sequential execution of individual work steps during a working time interval takes place until such time as the working time interval is ended or until the execution of a work step may not be ended on account of a malfunction. If the time for the current working time interval has at least almost expired, the work according to step 3-10 is continued with step 2-3 illustrated in FIG. 2.

If, on the other hand, the working time interval has not yet expired and a malfunction is present, this again may mean a conflict situation in which, in the same manner as above, contact may have to be made with other colleagues or experts in order to be able to search for the cause of the malfunction according to step S3-5. The contact made for the purpose of obtaining the necessary instructions may, for example, take the form of a telephone conference of experts, S3-7. If, however, the cause cannot be found within a reasonable time, another work step for the further processing is selected, step S3-8. The project execution is then continued with step S3-2.

A second example embodiment of the present invention is described in greater detail in the following.

The second example embodiment describes a project in which a plant, here an engine test bench, is controlled from a testing station and remote-controlled via a remote-control device.

Certain tests are carried out on the engine test bed for the new development of vehicle engines, e.g., the loading capacity and durability of new engines are tested with the aid thereof. The procurement of such engine test benches is relatively expensive and costly. In addition, their operation requires well-trained specialist personnel. The most rational utilization possible of the engine test benches may therefore be sought.

An engine test bench consists of a mechanical holding fixture for the engine to be tested and an electronic control and evaluation device connected thereto, called a testing station in the following. For a test bench run, the engine is mounted on the holding fixture and fitted with a plurality of sensors. The mechanical holding fixture has a plurality of actuators, which serve to adjust various engine parameters, such as for example the fuel supply quantity or the ignition point. The acquisition of the measurement values by the sensors and the selection of the settings for the actuators takes place by the testing station, which is connected via a plurality of data lines to the holding fixture for the purpose of transmitting the data required for this. On account of the large amounts of data to be exchanged and the plurality of lines, the testing station and the holding fixture may be arranged spatially close to one another.

In the testing station, the raw data received by the sensors is pre-processed into a representation suitable for engine specialists, e.g., in the form of tables, diagrams, measurement records, etc. Compared with the raw data, the data thus pre-processed may enable a better and more rapid overview of the engine behavior. The pre-processed data are displayed for example on screens or printed out as a hard copy.

Figure 4:
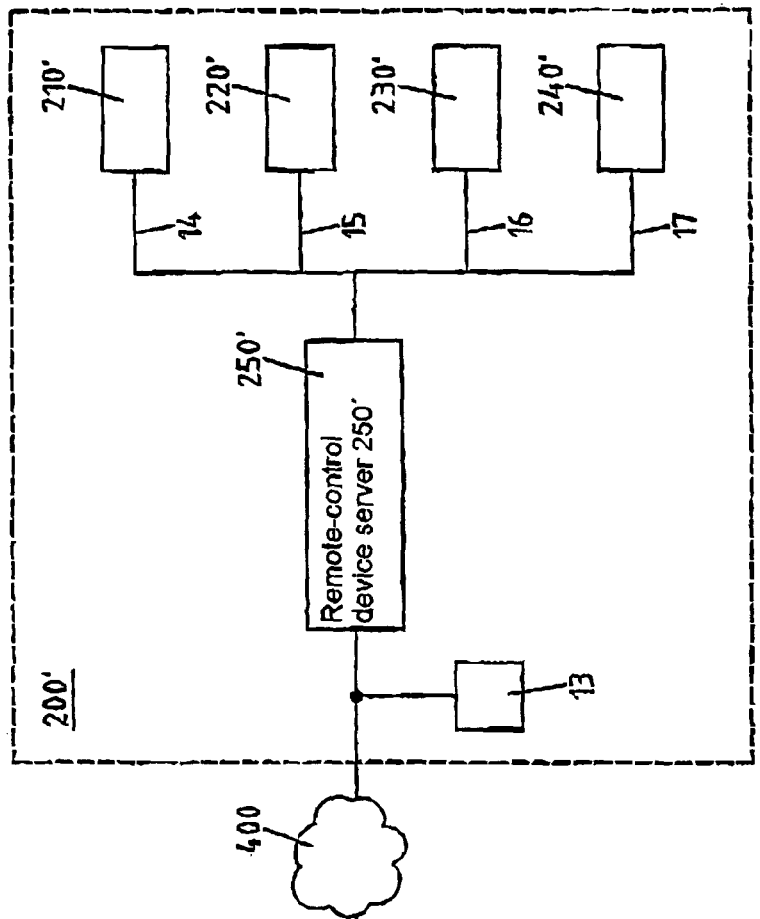
FIG. 4 is a schematic view of the hardware structure for a second example embodiment of the present invention with a first configuration of a remote-control device.
Figure 4:
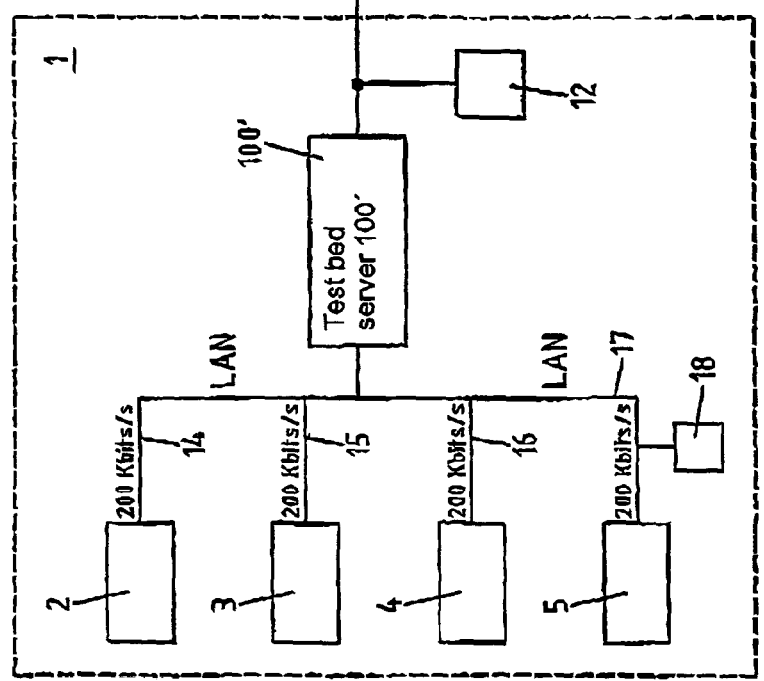

FIG. 4 illustrates one such testing station 1 for the control of an engine test bench. For clarity, the engine test bench is not represented with the holding fixture for the engine and the engine itself to be tested.

A project execution according to the present invention consists in the remote control of testing station 1 from an EDP device 200 located at an arbitrary site, also called remote-control device 200' in the following, via a data network 400. The site of the remote-control device may not have to correspond with the site of testing station 1 and the holding fixture.

As illustrated in FIG. 4, testing station 1 with the holding fixture is located for example in Mexico, whereas remote-control device 200' is located for example in Germany. Testing station 1 may include a control and check-back computer 2 with a test bench operating system, a data processing and display computer 3 as well as a parameter and display module 4. The control and check-back computer with test bench operating system 2 serves to adjust the actuators of the engine test bench and to display the values currently set. Data processing and display computer 3 serves to receive the measurement values determined by the sensors of the engine test bench and to process and display the same in the representation normally used by engine specialists. Parameter and display module 4 serves to provide an engine control device, obligatory with modern engines, with parameters such as characteristic curve fields for example, and to display the same on a screen.

To this extent, it concerns standard equipment for a testing station 1 of an engine test bench. For the purpose of remote control, there are also provided in the testing station a camera and microphone device 5, which serves to record image and acoustic data in testing station 1, as well as a main server 100, also referred to below as test bench server 100', which acts as an interface for connecting the aforementioned components 2 to 5 to a data network 400.

In a first example configuration illustrated in FIG. 4, remote-control device 200' has, for each of components 2 to 4 provided in testing station 1, a functionally identical component, namely a control and check-back computer 210' with the test bench operating system, a data processing and display computer 220' as well as a parameter and display module 230'. It may also include an output device 240' for displaying the image and acoustic data 230' recorded by camera and microphone device 5 in the testing station. Output device 240' may include a device for the operation of camera and microphone device 5, e.g., for changing the camera position or the image segment. Furthermore, remote-control device 200' has a server 250', which acts as an interface and as such links remote-control station 200', i.e., in particular aforesaid components 210', 220', 230' and 240', to data network 400. Server 250' distributes the screen contents onto the screens of corresponding components 210'-250' in remote-control device 200'.

Figure 5:
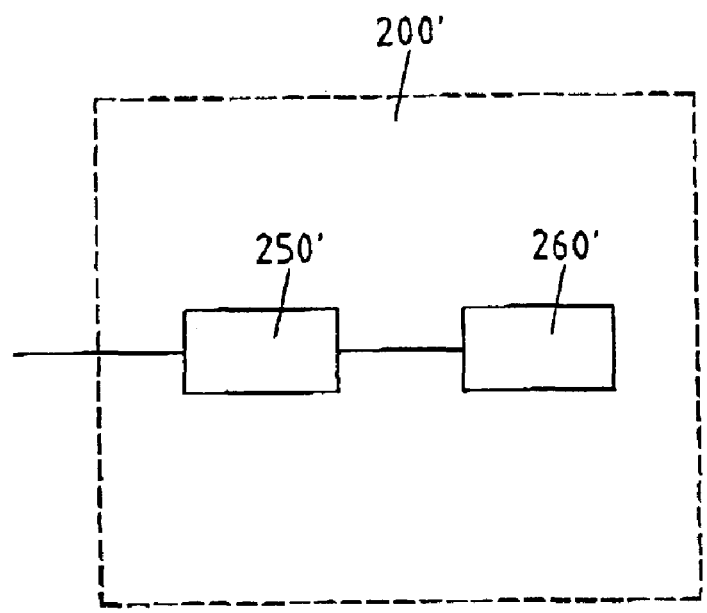
FIG. 5 is a schematic view of a second configuration for the remote-control device.

In a second example configuration, such as is illustrated in FIG. 5, remote-control device 200' only has server 250' and a large-screen display 260'. Here too, server 250' serves to link remote-control device 200' and data network 400. On large-screen display 260', images from one or more screens of test bench components 2 to 5 of the testing station may be reproduced, in particular also simultaneously. In the case of 4 components, the large-screen display may be split up into four. This may provide that the operator of remote-control device 200' may control all component computers 2 to 5 in testing station 1 by only one keyboard and only one mouse and not via the four individual components 210' to 250' as in the case of the first example configuration of remote-control device 200'. Such a control of large-screen display 260' is enabled by a special graphics card, to which up to four monitors may be connected. At the present time, four such cards may be installed in server 250', so that at present a maximum of 16 screens in testing station 1 may be represented on large-screen display 260' of remote-control device 200'. At the same time, the graphics card also enables an operation of up to 16 components in the testing station from the one large-screen display 260' in remote-control device 200'.

As distinct from the first example configuration of the remote-control device, the hardware of all components 210', 220', 230' and 240' may be spared with the second example configuration, because the remote control may take place solely via server 250' and a large-screen display 260'. A communication by the operator with testing station 1 then no longer takes place as it does with the first example configuration directly from a certain component 210'-240' of the remote-control station with corresponding component 2-5 in the testing station, but solely for via the central large-screen display. The operation may thus become clearer and more comfortable for the operator.

In both example configurations, testing station 1 is copied at least approximately 1:1 in remote-control device 200', even if differently in each case, so that the impression is conveyed to an operator in remote-control device 200' that he may influence the engine test bench directly—as it were, from the testing station. The interventions required for the operation may also be identical in remote-control device 200' to those in testing station 1. This means that renewed training of the operator may be avoided.

It is also possible to control the engine test bench alternately or simultaneously both from one or more remote-control devices 200' or 300 as well as directly from testing station 1. As a result, it is possible with testing stations 1 located in different world time zones to guarantee a 24-hour operation of the engine test bench in the respective locally imposed working time intervals or working time intervals that are found acceptable.

Test bench server 100' and server 250' in remote-control device 200' may both be operated independently of one another in two different operating modes.

In a first operating mode, servers 100, 250' connect individual components 2 to 5 or 210' to 240' respectively as separate bus nodes to network 400. Individual lines 14, 15, 16 and 17 are then conveyed, as it were, solely parallel through the respective server. This may provide that a combination of all the data streams 14, 15, 16 and 17 into a common data stream before they are fed into data network 400 may be unnecessary. A further aspect of the separate network connection of the components is that the data utilization of the network may be organized more uniformly.

In a second operating mode, servers 100', 250' combine individual data streams 14, 15, 16 or 17 into a common data stream. This may be advantageous when the server is used to transmit capturing data, as a result of which a marked data reduction may be achieved, as will be explained in greater detail below.

Both individual components 2 to 5 of testing station 1 as well as individual components 210' to 240' of remote-control device 200' and the two servers 100', 250' transmit the data in the form of data packets of small to medium size, in order in this manner to avoid a lengthy occupation of data network 400.

Since, as already mentioned, there is a brisk data exchange between the holding fixture for the engine and testing station 1 of the engine test bench and, consequently, large amounts of data may have to be transferred via data network 400 for remote control of the engine test bench, whereas on the other hand the transmission bandwidth of existing data networks 400 is limited or relatively expensive, an attempt is made to keep the amounts of data to be transmitted via network 400 small. Various options are available for this:

A first possibility consists in the fact that, instead of sending the raw data received directly from the sensors located on the engine to be tested, testing station 1 sends the latter as representative pre-processed data to the remote-control devices. The pre-processed data may be greatly compressed compared with the raw data.

A second possibility for a marked reduction in the amount of data to be transmitted and thus for a saving of data bandwidth in network 400 consists in the transmission of so-called capturing data. These capturing data represent the screen content (e.g., a hard copy) of screens of one or more components 2, 3 or 4 of testing station 1 or one or more components to 210' to 240' of remote-control station 200'. They may be extracted from the video memory of the individual component. By capturing, a transmission of data in at least approximately real time is possible, as a result of which the remote control of the testing station may become much more comfortable. Waiting for an acknowledgment may either be no longer required at all or required only once. A further aspect of the real-time transmission consists in the fact that the person operating the test bench from a remote-control station 200' is put in a position as though he were working directly in testing station 1, because the test and measurement values are displayed almost at the same time as in distant testing station 1.

In the capturing operation, too, both servers 100, 250' may be operated either in their first or second operating mode. They may be operated in the second operating mode described above, because the capturing operation may not only enable the marked data reduction, but also a simplified combination of all the screen contents of individual components 2 to 5. Both may be advantageous both for data transmission via network 400 and, in particular, also for the operation of large-screen display 260'.

When the data is combined, test bench server 100' in particular collects the capturing data from several screens of individual components 2 to 5 of testing station 1 and sends the latter in a collective data packet to server 250' of remote-control device 200'. Apart from the screen contents themselves, their original addresses, i.e., the addresses of their output components in testing station 1, are also contained in the data packets. On the basis of the addresses, server 250' is in a position to assign correctly the screen contents either to the screens of corresponding components 210' to 250' or to display them on the large-screen display in a suitable manner, depending on how remote-control device 200' is configured. A simple time adjustment, i.e., a simple synchronization, of the data packets is possible.

In the case where several remote-control devices are connected to testing station 1, their respective servers also coordinate various data requests from authorized operators of individual specialist operating devices.

It may be provided for the capturing operation for the latter to be implemented with already existing software that is available for purchase.

A further aspect of capturing is that the pre-processed data already available for evaluation by the engine experts may be used and transmitted directly. Separate data preparation may thus no longer be required for copying the data from the testing station in remote-control device 200'.

Already existing asynchronous data networks, e.g., an intranet or the Internet, may be used as network 400. Such data networks may have the drawback, however, that as a rule they do not have any defined transmission times for the data packets. It may happen, therefore, that a first data packet, which has been sent prior to a second data packet, arrives at the recipient only after the second data packet. With the so-called real-time operation sought in the present case, such an uncoordinated transmission may be undesirable for the remote control and the display of the received data. In accordance with an aspect of the present invention, therefore, synchronization information is added to the data packets. Such synchronization information may, for example, be a so-called Sync-Master. Such a Sync-Master may be triggered for example by a clock time, by an event or by both. A consecutive coding is used for this, which is established as required. This coding is added to the data sent. This coding is notified to the data recipient. As an alternative to the Sync-Master, use may also be made of a standard synchronous pulse. It may be provided to use timing marks, i.e., real-time information, as synchronous information.

With each of the aforementioned examples of synchronous information, the recipient is able to reproduce the received data packets in the correct sequence. Furthermore, events corresponding to one another, originally occurring simultaneously at components 2 to 5 and 210' to 240', may also again be correctly assigned to one another after receipt, so that the operator working in the distant remote-control device may gain a uniform impression when the received data and measurement values are displayed.

A consequence of the synchronization of the data packets is that relatively rapidly transmitted data packets may have to be artificially delayed, so that they may be displayed in remote-control station 200' simultaneously with data packets transmitted more slowly. In some cases, this may lead to a kind of data jamming of the relatively rapidly transmitted data packets, which may be undesirable on account of the storage requirement needed for this. Furthermore, the jammed information is out of date after a certain time, such that it may no longer be used for a real-time display of the data. In accordance with an aspect of the present invention, therefore, a forced updating (refreshing) of the displayed data is carried out at certain time intervals, e.g., at an interval of several seconds. The jammed data packets are thereby rejected, insofar as they may be replaced by up-to-date data packets or they are acknowledged as out of date. Work then continues with the updated data.

With image transmission using a standard compression process, e.g., MPEG 2, such a forced updating may provide that smaller image changes, which on account of the compression process are not in themselves transmitted, nonetheless also appear on the receiver side after a certain time.

If, as described above, a test bench server 100' and a remote-control server 250' are provided in order to carry out the data transfer between test bench 1 and at least one remote-control device 200' in the form of data packets, the use of special synchronization information may under certain conditions be unnecessary. This may apply when the data transfer takes place between servers 100 and 250', e.g., via an intranet, in the form of so-called TCP/IP protocols, whereby these protocols are set up solely via a local network including lines 14, 15, 16 or 17.

In accordance with an aspect of the present invention, the data packets exchanged via data network 400 are recorded over a certain period, e.g., in the course of an hour. This may provide that the data may be evaluated or further processed, e.g., into diagrams or for the purpose of statistical analyses, by the engine experts in peace after the test has been carried out. A further aspect is that certain events in a test bench run, e.g., a defect in the engine arising in the engine test, may be analyzed again after it has emerged (so-called post-mortem analysis). An unambiguous time assignment is also possible in the subsequent playing of the recorded data as a result of using the synchronization information, which for example makes for a more uniform image sequence.

For data recording, at least one host computer 12 or 13 is provided, which may be connected to network 400 at any point. It is possible for the host computer to be arranged either in the vicinity of testing station 1 or in the vicinity of remote-control device 200'. The first-mentioned arrangement may provide that the cost of transmitting data over fairly great distances via data network 400 is kept low. The provision of only one host computer may be recommended when, for example, the development authority is at the location of testing station 1 and the expert evaluation of the measurement results supplied by the sensors also takes place there.

As an alternative to one host computer 12, additional host computers 13 may also be assigned to remote-control devices 200'. In order to avoid a high network load between testing station 1 and spatially distant remote-control devices 200', 300, each of host computers 12, 13 stores the data of the device assigned to it. The host computers may monitor the utilization of network 400, in order to be able to carry out a balancing of their data automatically at times of low utilization. The described installation of several host computers 12, 13 may be recommended when an evaluation of the data is to be carried out not only at the location of the testing station, but also at the location of the remote-control device. By providing the two host computers, a marked reduction of the network load may then be achieved.

For a further reduction in the data transmission outlay, camera and acoustic recording device 5 is provided with a data compression device, which, with the use of special hardware and software, carries out a data compression of the image data according to a standard compression process, e.g., MPEG 2. The data compression device has a hardware coder, which carries out the coding into the MPEG 2 format. By software, the MPEG 2-coded data may then be matched to the network bandwidths available. In this manner, an observer may determine the image resolution and the image color depth in individual steps. Decoding software is used by the recipient to decode the image data. For the coding of the sound types, a so-called wave-coder is used which has both mono and stereo adjustments, and may also operate external midi devices. Decoding software is also used on the receiving side. By a hardware dual system, the computer may receive, i.e., store, as well as transmit data.

In accordance with an aspect of the present invention, temporary data storage device 18, in which complete uncompressed image information is temporarily stored in high image resolution, is provided for the compensation of temporary image resolution changes caused by data compression, e.g., when camera 5 swivels. At times of low utilization of data network 400, these data are then fed to host computer 12 and then later to host computer 13 for storage. This may provide that the complete image information is available in the best possible representation during subsequent viewing of the recorded data, without particular load peaks thereby occurring during the transmission via network 400.

In order to avoid damage to the engine or to testing station 1, it may be provided, before a test bench run with the engine, to transmit certain permitted limiting values from remote-control device 200' to testing station 1. During the test bench run, these limiting values are then monitored by testing station 1 and, if at least one of these limiting values is exceeded, a warning is emitted to the operator or the test bench is wholly or partially shut down. Damage to the engine may occur, for example, when the ignition point is inadvertently set to an extreme pre-ignition. As a result of the described transmission of limiting values, damage to the engine and/or to the test bench, due for example to a disturbed or interrupted data transmission via network 400, may be avoided.

It may be provided that at least some of components 2 to 5 or 210' to 240' have devices for the simultaneous transmission of data via network 400 and for local storage.

Figure 6:
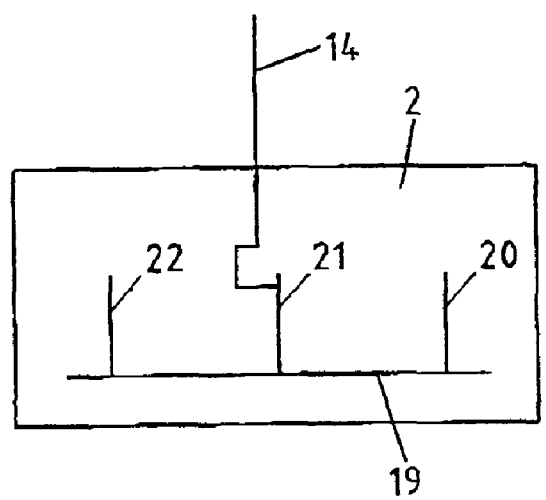
FIG. 6 is a schematic detailed view of a control and check-back computer.

FIG. 6 illustrates that, when use is made of commercially available personal computers for acquiring the measurement and control information and the video information, which is transmitted via lines 14 to 17, this may take place, e.g., through the transmission of the aforementioned information via an internal bus system 19 of control and check-back computer 2. There is then connected to this bus system 19, in addition to a node 20 required for the measurement data acquisition, a further node 21, i.e., a network card, which outputs to test bench server 100' the measurement data evaluated by node 20 and then fed into bus system 19. Furthermore, a node 22 is provided, which temporarily stores the measurement data and makes them available on request for transmission to host computer 12. Despite a time-critical transmission of large amounts of data, therefore, a remote transmission and simultaneous storage of the aforementioned data may be enabled with components that are standard on personal computers, as a result of which the invention may be implemented at relatively low cost.

The first and the second example embodiments may be linked together such that, in the second example embodiment, i.e., with the remote control of the engine test bench, the transition between two successive working time intervals takes place according to the first example embodiment, in particular with the logging of object data and project management data described there.

The invention claimed is:

1. A method for carrying out a project from a plurality of differently located electronic data processing devices connected via a data network with a main server arranged for central data loading for data exchange, comprising:
    at least partially activating one of the plurality of electronic data processing devices during individual working time intervals, the data network arranged supra-regionally, individual electronic data processing devices located distributed at least partially supra-regionally;
    wherein the individual electronic data processing devices are located at least partially in different world time zones; and
    wherein the activating includes cyclically alternatingly activating individual electronic data processing devices during successive working time intervals.

2. The method according to claim 1, wherein the network is arranged internationally.

3. The method according to claim 1, wherein the data network is arranged as least one of partially line-linked and not line-linked.

4. The method according to claim 3, wherein the data network includes one of an intranet and the Internet.

5. The method according to claim 4, further comprising exchanging data between an operator of an electronic data processing device and the main server via an Internet browser.

6. The method according to claim 1, further comprising transmitting data in the data network at least approximately in real time.

7. The method according to claim 1, further comprising transmitting data between the main server and the electronic data processing devices at least approximately in real time.

8. The method according to claim 1, wherein the individual working time intervals follow one another without a pause and each individual working time interval lasts approximately 6 to 8 hours.

9. The method according to claim 1, further comprising at least one of project monitoring, accessing knowledge databanks, exchanging data and viewing a time model overview via at least one of the electronic data processing devices.

10. The method according to claim 1, wherein the data network is configured for information exchange between the electronic data processing devices and the main server at a transmission rate of at least 1 Mbit/s.

11. The method according to claim 1, further comprising selecting and transmitting data according to a predetermined priority in the event of bandwidth reduction in the data network.

12. The method according to claim 1, wherein the main server is arranged as a component of a testing station configured to control a plant and the electronic data processing devices are arranged as remote-control devices configured for remote control of the plant via the data network and the testing station.

13. The method according to claim 12, wherein the testing station includes an engine test bench.

14. The method according to claim 12, further comprising performing a data reduction by at least one of the testing station and the remote-control device before transmitting the data via the data network.

15. The method according to claim 14, wherein the data reduction includes capturing screen data.

16. The method according to claim 14, wherein the data reduction includes streaming of video data as necessary.

17. The method according to claim 12, wherein data packets to be transmitted include synchronization information.

18. The method according to claim 17, wherein the data network is arranged as an asynchronous network.

19. The method according to claim 17, further comprising occasional forced updating of data to be transmitted in at least one of the testing station and the remote-control devices.

20. The method according to claim 12, further comprising transmitting permitted limiting values for operation of the plant by at least some of the remote-control devices to the testing station before start-up of the plant.

21. A method for carrying out a project from a plurality of differently located electronic data processing devices connected via a data network with a main server arranged for central data loading for data exchange, comprising:
    at least partially activating one of the plurality of electronic data processing devices during individual working time intervals, the data network arranged supra-regionally, individual electronic data processing devices located distributed at least partially supra-regionally; further comprising:
    (a) selecting one of the plurality of electronic data processing devices for partial execution of the project during a first working time interval;
    (b) partially executing the project in accordance with the selected electronic data processing device at a respective site during the first subsequent working time interval;
    (c) logging and storing in at least one object file object data assigned to a work object and processed during a first subsequent working time interval;
    (d) retrieving logged project data of the first subsequent working time interval at a start of a second subsequent working time interval from the object file of one of a same and another electronic data processing device selected for project execution during the second subsequent time interval; and
    (e) continuing project-specific work on the basis of the retrieved object data during the first subsequent working time interval by repeating steps (b) to (d) until the project is one of completed and interrupted at the end of a work step.

22. The method according to claim 21, wherein the step (c) includes logging and storing project management data in an own project management file.

23. The method according to claim 22, wherein the project management data represent at least one of respective work steps performed during a working time interval, a sequence thereof and a project status.

24. The method according to claim 22, wherein the project management data is logged and stored in the project management data logging and storing step at least partially automatically.

25. The method according to claim 22, wherein the step (d) includes retrieving project management data of a preceding work step from the project management file.

26. The method according to claim 22, wherein the individual working time interval includes three phases following one another, the three phases including a shift start phase, a shift in-progress phase and a shift end phase, one of object data and project management data of a preceding working time interval retrieved in the retrieving step during the shift start phase, one of the object data and the project management data of a current working time interval logged and stored in the logging and storing step during at least one of the three phases.

27. The method according to claim 22, further comprising making available suitable screen pages respectively on screens of the electronic data processing devices for logging of at least one of the project management data and work results.

28. The method according to claim 27, wherein the screen pages include input masks.

29. The method according to claim 27, further comprising automatically adapting the screen pages to a current project status.

30. A non-transitory computer-readable medium storing instructions adapted to execute a method for carrying out a project from a plurality of differently located electronic data processing devices connected via a data network with a main server arranged for central data loading for data exchange, the method including: at least partially activating one of the plurality of electronic data processing devices during individual working time intervals, the data network arranged supra-regionally, individual electronic data processing devices located distributed at least partially supra-regionally;
    wherein the individual electronic data processing devices are located at least partially in different world time zones; and
    wherein the method further includes exchanging data between an operator of an electronic data processing device and the main server via an Internet browser.

31. The medium according to claim 30, wherein the network is arranged internationally.

32. The medium according to claim 30, wherein the data network is arranged as least one of partially line-linked and not line-linked.

33. The medium according to claim 32, wherein the data network includes one of an intranet and the Internet.

34. The medium according to claim 30, wherein the activating includes cyclically alternatingly activating individual electronic data processing devices during successive working time intervals.

35. The medium according to claim 30, wherein the method further includes transmitting data in the data network at least approximately in real time.

36. The medium according to claim 30, wherein the method further includes transmitting data between the main server and the electronic data processing devices at least approximately in real time.

37. The medium according to claim 30, wherein the individual working time intervals follow one another without a pause and each individual working time interval lasts approximately 6 to 8 hours.

38. The medium according to claim 30, wherein the method further includes at least one of project monitoring, accessing knowledge databanks, exchanging data and viewing a time model overview via at least one of the electronic data processing devices.

39. The medium according to claim 30, wherein the data network is configured for information exchange between the electronic data processing devices and the main server at a transmission rate of at least 1 Mbit/s.

40. The medium according to claim 30, wherein the method further includes selecting and transmitting data according to a predetermined priority in the event of bandwidth reduction in the data network.

41. The medium according to claim 30, wherein the main server is arranged as a component of a testing station configured to control a plant and the electronic data processing devices are arranged as remote-control devices configured for remote control of the plant via the data network and the testing station.

42. The medium according to claim 41, wherein the testing station includes an engine test bench.

43. The medium according to claim 41, wherein the method further includes performing a data reduction by at least one of the testing station and the remote-control device before transmitting the data via the data network.

44. The medium according to claim 43, wherein the data reduction includes capturing screen data.

45. The medium according to claim 43, wherein the data reduction includes streaming of video data as necessary.

46. The medium according to claim 41, wherein data packets to be transmitted include synchronization information.

47. The medium according to claim 46, wherein the data network is arranged as an asynchronous network.

48. The medium according to claim 46, wherein the method further includes occasional forced updating of data to be transmitted in at least one of the testing station and the remote-control devices.

49. The medium according to claim 41, wherein the method further includes transmitting permitted limiting values for operation of the plant by at least some of the remote-control devices to the testing station before start-up of the plant.

50. The medium according to claim 30, wherein the computer program is configured to be executed on the main server.

51. A non-transitory computer-readable medium storing instructions adapted to execute a method for carrying out a project from a plurality of differently located electronic data processing devices connected via a data network with a main server arranged for central data loading for data exchange, the method including:
   at least partially activating one of the plurality of electronic data processing devices during individual working time intervals, the data network arranged supra-regionally, individual electronic data processing devices located distributed at least partially supra-regionally; wherein the method further includes:
   (a) selecting one of the plurality of electronic data processing devices for partial execution of the project during a first working time interval;
   (b) partially executing the project in accordance with the selected electronic data processing device at a respective site during a first subsequent working time interval;
   (c) logging and storing in at least one object file object data assigned to a work object and processed during the first subsequent working time interval;
   (d) retrieving logged project data of the first subsequent working time interval at a start of a second subsequent working time interval from the object file of one of a same and another electronic data processing device selected for project execution during the second subsequent time interval; and
   (e) continuing project-specific work on the basis of the retrieved object data during the first subsequent working time interval by repeating steps (b) to (d) until the project is one of completed and interrupted at the end of a work step.

52. The medium according to claim 51, wherein the step (c) includes logging and storing project management data in an own project management file.

53. The medium according to claim 52, wherein the project management data represent at least one of respective work steps performed during a working time interval, a sequence thereof and a project status.

54. The medium according to claim 52, wherein the project management data is logged and stored in the project management data logging and storing step at least partially automatically.

55. The medium according to claim 52, wherein the step (d) includes retrieving project management data of a preceding work step from the project management file.

56. The medium according to claim 52, wherein the individual working time interval includes three phases following one another, the three phases including a shift start phase, a shift in-progress phase and a shift end phase, one of object data and project management data of a preceding working time interval retrieved in the retrieving step during the shift start phase, one of the object data and the project management data of a current working time interval logged and stored in the logging and storing step during at least one of the three phases.

57. The medium according to claim 52, wherein the method further includes making available suitable screen pages respectively on screens of the electronic data processing devices for logging of at least one of the project management data and work results.

58. The medium according to claim 57, wherein the screen pages include input masks.

59. The medium according to claim 57, wherein the method further includes automatically adapting the screen pages to a current project status.

60. A system, comprising:
   a main server;
   differently located electronic data processing devices; and
   a data network;
   wherein the system is configured to perform a method for carrying out a project from a plurality of differently located electronic data processing devices connected via the data network with the main server arranged for central data loading for data exchange, the method including at least partially activating one of the plurality of electronic data processing devices during individual working time intervals, the data network arranged supra-regionally, individual electronic data processing devices located distributed at least partially supra-regionally;
   wherein the individual electronic data processing devices are located at least partially in different world time zones; and
   wherein the activating includes cyclically alternatingly activating individual electronic data processing devices during successive working time intervals.

61. The system according to claim 60, wherein the network is arranged internationally.

62. The system according to claim 60, wherein the data network is arranged as least one of partially line-linked and not line-linked.

63. The system according to claim 62, wherein the data network includes one of an intranet and the Internet.

64. The system according to claim 63, wherein the method further includes exchanging data between an operator of an electronic data processing device and the main server via an Internet browser.

65. The system according to claim 60, wherein the method further includes transmitting data in the data network at least approximately in real time.

66. The system according to claim 60, wherein the method further includes transmitting data between the main server and the electronic data processing devices at least approximately in real time.

67. The system according to claim 60, wherein the individual working time intervals follow one another without a pause and each individual working time interval lasts approximately 6 to 8 hours.

68. The system according to claim 60, wherein the method further includes at least one of project monitoring, accessing knowledge databanks, exchanging data and viewing a time model overview via at least one of the electronic data processing devices.

69. The system according to claim 60, wherein the data network is configured for information exchange between the electronic data processing devices and the main server at a transmission rate of at least 1 Mbit/s.

70. The system according to claim 60, wherein the method further includes selecting and transmitting data according to a predetermined priority in the event of bandwidth reduction in the data network.

71. The system according to claim 60, wherein the main server is arranged as a component of a testing station configured to control a plant and the electronic data processing devices are arranged as remote-control devices configured for remote control of the plant via the data network and the testing station.

72. The system according to claim 71, wherein the testing station includes an engine test bench.

73. The system according to claim 71, wherein the method further includes performing a data reduction by at least one of the testing station and the remote-control device before transmitting the data via the data network.

74. The system according to claim 73, wherein the data reduction includes capturing screen data.

75. The system according to claim 73, wherein the data reduction includes streaming of video data as necessary.

76. The system according to claim 71, wherein data packets to be transmitted include synchronization information.

77. The system according to claim 76, wherein the data network is arranged as an asynchronous network.

78. The system according to claim 76, wherein the method further includes occasional forced updating of data to be transmitted in at least one of the testing station and the remote-control devices.

79. The system according to claim 71, wherein the method further includes transmitting permitted limiting values for operation of the plant by at least some of the remote-control devices to the testing station before start-up of the plant.

80. The system according to claim 60, wherein the main server is configured to execute a computer program for performing the method and to store at least one of an object file and a project management file one of separately and together in at least one databank of the data network.

81. The system according to claim 60, further comprising a testing station including the main server arranged as a test bench server and a plurality of electronic data processing devices arranged as remote-control devices, the testing station configured to control a plant, the remote-control devices configured for remote control of the plant via the data network and the testing station.

82. The system according to claim 81, wherein the testing station includes an engine test bench.

83. The system according to claim 81, wherein the testing station includes a plurality of components connected via a LAN to the test bench server.

84. The system according to claim 83, wherein the components include at least one of a control and check-back computer, a data processing and display computer, an image and acoustic recording device and a parameter and display module.

85. The system according to claim 81, wherein at least some of the remote-control devices include a plurality of components and a server, the components connected to the server, the server configured to link the components to the data network.

86. The system according to claim 85, wherein the components include at least one of a control and check-back computer, a data processing and display computer and a parameter and display module.

87. The system according to claim 85, wherein the components are connected to the server via a LAN.

88. The system according to claim 85, wherein identical components of the testing station and one of the remote-control devices are connected via a separate network connection.

89. The system according to claim 85, wherein at least some of the remote-control devices include a large-screen display and a server configured to link the large-screen display to the data network.

90. The system according to claim 81, wherein the test bench server is configured to collect as capturing data screen data from at lease some screens of components of the testing station connected via a LAN and to transmit the collected capturing data to another server.

91. The system according to claim 90, wherein the test bench server is configured to transmit the collected capturing data in the form of a data collection packet.

92. The system according to claim 85, wherein the servers in the remote-control devices are configured to collect as capturing data screen data from at least some screens of the components of the remote control devices connected via a LAN and to transmit the collected capturing data to the test bench server.

93. The system according to claim 92, wherein the servers in the remote-control devices are configured to transmit the collected capturing data in the form of a data collection packet.

94. The system according to claim 92, wherein at least one of the test bench server of the testing station and the server of the remote-control device is configured to receive capturing data transmitted by another one of the servers and to output the capturing data as independent screen information for one of display on a plurality of individual screens and display in the form of several independent images on a large-screen display.

95. The system according to claim 60, wherein the data network is arranged as an asynchronous network.

96. The system according to claim 81, wherein at least one of the testing station and the remote-control devices includes a local data memory configured to record data packets one of to be transmitted and exchanged.

97. A system, comprising:
a main server;
differently located electronic data processing devices; and
a data network;
wherein the system is configured to perform a method for carrying out a project from a plurality of differently located electronic data processing devices connected via the data network with the main server arranged for central data loading for data exchange, the method including at least partially activating one of the plurality of electronic data processing devices during individual working time intervals, the data network arranged supra-regionally, individual electronic data processing devices located distributed at least partially supra-regionally;
wherein the method further includes:
(a) selecting one of the plurality of electronic data processing devices for partial execution of the project during a first working time interval;
(b) partially executing the project in accordance with the selected electronic data processing device at a respective site during a first subsequent working time interval;

(c) logging and storing in at least one object file object data assigned to a work object and processed during the first subsequent working time interval;

(d) retrieving logged project data of the first subsequent working time interval at a start of a second subsequent working time interval from the object file of one of a same and another electronic data processing device selected for project execution during the second subsequent time interval; and (e) continuing project-specific work on the basis of the retrieved object data during the first subsequent working time interval by repeating steps (b) to (d) until the project is one of completed and interrupted at the end of a work step.

98. The system according to claim 97, wherein the step (c) includes logging and storing project management data in an own project management file.

99. The system according to claim 98, wherein the project management data represent at least one of respective work steps performed during a working time interval, a sequence thereof and a project status.

100. The system according to claim 98, wherein the project management data is logged and stored in the project management data logging and storing step at least partially automatically.

101. The system according to claim 98, wherein the step (d) includes retrieving project management data of a preceding work step from the project management file.

102. The system according to claim 98, wherein the individual working time interval includes three phases following one another, the three phases including a shift start phase, a shift in-progress phase and a shift end phase, one of object data and project management data of a preceding working time interval retrieved in the retrieving step during the shift start phase, one of the object data and the project management data of a current working time interval logged and stored in the logging and storing step during at least one of the three phases.

103. The system according to claim 98, wherein the method further includes making available suitable screen pages respectively on screens of the electronic data processing devices for logging of at least one of the project management data and work results.

104. The system according to claim 103, wherein the screen pages include input masks.

105. The system according to claim 103, wherein the method further includes automatically adapting the screen pages to a current project status.

* * * * *